Patented Oct. 11, 1927.

1,644,730

UNITED STATES PATENT OFFICE.

HERBERT W. KELLEY, OF WINCHESTER, AND WILLIAM D. WOLFE, OF NEWTON, MASSACHUSETTS, ASSIGNORS, BY MESNE ASSIGNMENTS, TO UNITED SHOE MACHINERY CORPORATION, OF PATERSON, NEW JERSEY, A CORPORATION OF NEW JERSEY.

PROCESS OF TREATING RUBBER LATEX AND PRODUCT OBTAINED THEREBY.

No Drawing. Application filed March 16, 1925. Serial No. 16,046.

This invention relates to a method of treating commercial rubber latex to reduce or remove the ammoniacal odor thereof as well as to render the latex more suitable for general use as a cement, and to the product produced by the method.

The freshly gathered latex, which is destined for shipment to this and other countries for industrial use, is treated with ammonia to prevent coagulation of the latex during the time which must elapse before the latex is actually put to industrial uses. The greater part of this latex is used in the manufacture of rubber goods, such as automobile tires, and when put to such uses gives no trouble, so far as we are aware, by reason of the ammonia content, since commonly the first treatment to which the latex is subjected is to spray it into a current of warm air whereby the water and ammonia are driven off and the rubber obtained in solid form.

It has been found that latex can be used as a cement and more particularly, for example, that it is capable of forming a good bond between certain parts used in the manufacture of boots and shoes. Its use, however, in factories in which boots and shoes or parts thereof are manufactured is greatly hampered and in some instances rendered practically impossible by reason of the fumes of ammonia which are given off. In such factories cement is commonly put into more or less open receptacles, such as the reservoirs of cementing machines, over which operators are compelled to work; and under these circumstances, when commercial latex—usually diluted with water to some extent, as will presently be explained—is used, the fumes of ammonia are often too strong to be borne.

Commercial latex is extremely susceptible to coagulation if treated with acids, so much so that coagulation will take place if the hydrogen ion concentration—that is, the number of hydrogen ions per unit volume—rises above a very low limit. The hydrogen ion concentration of such solutions is commonly referred to as its pH value which is expressed as a numeral, representing the exponent of the denominator of the fraction $\frac{1}{10}$; and commercial latex will coagulate practically at once if its pH value becomes less than 5.5. With a substance in which coagulation takes place at so low a concentration of hydrogen ions, the use of an acid to neutralize the ammonia is very strongly contraindicated, since with an acid, such, for example as sulphuric, it is difficult to add the acid gradually in small amounts to the latex without causing local coagulation; and, even if that difficulty were overcome, it would be practically impossible to add the equivalent amount sufficient to neutralize the ammonia without adding an excess sufficient to produce complete coagulation, the equivalent amount being just the amount of acid necessary to react completely with the ammonia. As to diluting the acid and then adding it, the practical difficulty is that the dilution would have to be carried to such a degree that the rubber content per unit volume of the treated latex would be so small as to render the latex unfit for use as a cement.

We have found, however, that certain weak acids may readily be used to remove or reduce the free ammonia content of the latex without causing coagulation. The particularly desirable features, which we have found these acids to possess, are first that they may be added to commercial latex without undue difficulty in the matter of causing local coagulation and second that they may be added in considerable excess of the amount equivalent to the ammonia without even then causing coagulation. The practical advantages of these acids are thus the facts that they may be added to the latex in concentrated solution—some of them may be added in solid form—and that no great care need be exercised in gauging the total amount added, since with any of them a considerable excess may be added without bringing the pH value of the treated latex below the critical value of 5.5; and, with some of them, as much as several hundred per cent excess may be so added.

The weak acids which are suitable for use differ greatly in solubility, and their solubilities as well as their ionization constants must be considered in defining them, since the permissible strength of a given acid varies inversely as its solubility. The effect of the solubility of an acid upon coagulation of commercial latex, when the acid is added to the latex, may be readily understood from a consideration of two acids both suitable for use, one of which is more soluble but weaker than the other. For example, boric acid, which is freely soluble in water, may be added in solid form to latex considerably in excess of the amount equivalent to the ammonia without causing coagulation; but so can benzoic acid which is many times as strong as boric acid, the explanation of the ease with which the benzoic acid may be employed lying in the fact that benzoic acid is so sparingly soluble in water that, upon addition of the benzoic acid to the latex, at no point can the concentration of its hydrogen ions get high enough to cause coagulation. Instead, the hydrogen ions are formed comparatively slowly in the latex and are removed fast enough by the ammonia to prevent an accumulation of them sufficient to bring the pH value of the latex below the critical value of 5.5. The permissibility of a given acid for use in removing or reducing the ammoniacal odor of commercial latex thus depends to an extent upon whether the acid is freely soluble in water,—a freely soluble acid being defined, for the purposes of this specification, as one which at a temperature of 25° centigrade will form a solution one-tenth normal or greater with reference to its most active hydrogen; and a sparingly soluble acid being defined as one which, under the same conditions, will form a solution less than one-tenth normal. If the acid is freely soluble, the value of its ionization constant must be less than a certain limit which will presently be specified. If the acid is sparingly soluble the value of its ionization constant may be above that limit.

With this explanation and assuming that K represents the ionization constant of the first available hydrogen of an acid at 25° C. and that S represents the solubility in gram equivalents per liter at the same temperature, the permissible K value for freely soluble acids is a value less than $10^{-4.75}$; and the permissible K value for sparingly soluble acids is such that the K value multiplied by the S value is less than $10^{-5.5}$. These limits, it should be understood, have been chosen to correspond to the maximum variations in ammonia content commonly found in commercial latex.

It is believed to be unnecessary to point out specifically all of the suitable acids since lists of them may readily be made by consulting data to be found in standard books of reference. It should, of course, be understood that the term acid as here used includes not only acids but substances, such for example as acid salts, which furnish available hydrogen when dissolved in water. It should also be understood that acids of high volatility such as carbonic acid and hydrogen sulphide, which pass quickly out of the solution and therefore do not bind the ammonia, are not included.

Treatment of commercial latex with weak acids, as has been outlined above, will not only remove the free ammonia entirely or reduce it to such an extent that its odor is no longer objectionable, as may be desired, but will increase the viscosity of the latex, a result which is particularly desirable when the treated latex is to be used in certain operations, for example when it is to be used in a cementing machine in which a rotating roll is partly submerged in the latex or is supplied with latex from a reservoir located above it and thus carries the latex on its periphery to the article which is to be coated. And this increase in viscosity is of such degree that in some cases the treated latex may contain a considerable amount of water above the original amount (as much as 25 per cent in some cases) which was added to it before, after or during treatment and still have a viscosity higher than that of the untreated latex. And viewed from another standpoint, this possibility of adding water without rendering the treated latex less viscous than the untreated latex from which it was made facilitates the practice of the method, since this additional water acts to prevent local coagulation which might otherwise take place due to local excess of hydrogen ion concentration when the latex is being treated with the acid. As to this matter of dilution, the rubber content of commercial latex is in the neighborhood of 38%, while a rubber content of half that amount is sufficient to impart to the treated product proper adhesive strength for most of the uses to which the product is put. Commonly, therefore, the commercial latex will be diluted with as much as an equal volume of water by adding water before, during or after treatment, and in some cases the dilution will be carried considerably further. In the cases of some acids, for example sodium di-hydrogen phosphate, it is necessary to dissolve the acid in several times its weight in water before adding it to the latex; and in all cases the latex should be stirred briskly during the addition of the acid to avoid local coagulation.

Turning now by way of example to certain specific acids, we have found that acids containing boron trioxide are extremely well adapted to carrying out the method both because they are readily available and because they are so weak that they may be added to commercial latex in large excess over the amounts equivalent to the ammonia without producing coagulation. The reaction which takes place when boric acid for example reacts with ammonia is:—

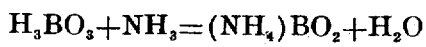
$$H_3BO_3 + NH_3 = (NH_4)BO_2 + H_2O$$

from which the equivalent amount of boric acid for 17 parts by weight of ammonia is seen to be 62 parts by weight. When, however, such equivalent amount of boric acid is added to commercial latex, the partial pressure of the ammonia is not sufficiently reduced to remove the objectionable ammoniacal odor. The boric acid treatment may be made effective, however, to remove or reduce to the desired degree the ammoniacal odor if the acid is added in sufficient excess, and specifically the odor of ammonia may be substantially entirely removed without causing coagulation of the latex by adding three times the equivalent amount of boric acid.

Assuming that the latex contains .75% of ammonia, it may be treated according to the present invention by adding to 100 parts of it by weight 25 parts by weight of water and 8.25 parts by weight of boric acid. Latex treated in this manner, in addition to being substantially freed from the odor of ammonia, has imparted to it certain desirable characteristics.

The viscosity of the latex is increased, a desirable result which has been referred to above. In the specific example of treatment of latex given, the latex was diluted by the addition to it of 25% of water, since latex, thus diluted and then treated with boric acid, has about the viscosity and rubber content desirable for use in a machine for applying the treated latex as a cement to certain articles used in the manufacture of boots and shoes. It should be understood, however, that no water need be added if a more viscous product or one containing a higher rubber content is desired and that, on the other hand, the dilution may be carried much farther if a less viscous product or one containing less rubber is wanted, the only limit to dilution, so far as we are aware, being the reduction of the rubber content to a point at which the adhesive quality of the treated latex is inefficient for the purpose for which the treated latex may be desired to be used as a cement.

The treated latex may be frozen and then thawed without producing coagulation of the rubber, this capability of withstanding freezing without deterioration being a particularly desirable one since the treated latex can be shipped during the winter months without requiring any special precautions concerning temperature.

As an added advantage, the boric acid acts as a preservative to prevent "souring" or fermentation of the latex.

Instead of making use of boric acid alone to remove the ammoniacal odor, either boric acid or borax may be used in combination with a polyhydroxyl compound, such as dextrose, invert sugar or glycerine, in which two OH groups are bound to adjacent carbon atoms and react with the boron compound to produce a complex acid which is somewhat stronger than boric acid.

Assuming as before that the latex to be treated contains .75% of ammonia and that a cement of substantially the same viscosity as that produced by the specific formula which has been given above is desired, there may be added to 100 parts of latex 25 parts of water, 2.75 parts of boric acid and 8.25 parts of a solid containing 90% of dextrose. When a polyhydroxyl compound of the type indicated is used in combination with a boron compound, borax may be substituted for boric acid and invert sugar or glycerine for dextrose; but the amounts of the substituted compounds will be somewhat different from the amounts of boric acid and dextrose stated in the specific formula given above. Assuming for brevity that one part of boric acid in combination with three parts of dextrose is required, as in the given formula, then the required quantities of the other combinations of substances will be about as follows:—

| | Parts |
|---|---|
| Borax | 3 |
| Boric acid | 1 |
| Borax | 3 |
| Boric acid | 1 |
| Borax | 3 |
| Dextrose | 6 |
| Glycerine | 12 |
| Glycerine | 12 |
| Invert sugar | 3 |
| Invert sugar | 6 |

"Dextrose", as used in the table above, refers to a solid containing 90% of dextrose; and "invert sugar" to a syrup containing 80% of invert sugar. It should, of course, be understood that boric acid and any one of the polyhydroxyl compounds may be successfully used in varied proportions since either boric acid alone or in combination with a polyhydroxyl compound is effective. When borax and one of the polyhydroxyl compounds are used, it is usually necessary to dilute the latex somewhat with water in order to insure that no objectionable coagulation of the rubber shall take place.

There have been given above certain specific examples of the amounts of reagents which will remove substantially all of the ammoniacal odor from a given sample of commercial latex. It should be understood, however, first that a less amount may be used in case it appears desirable to leave a small unobjectionable amount of free ammonia in the treated latex and second that an excess of reagent or reagents may be added either for the preservative effect desired or to increase the viscosity of the treated latex.

In the claims appended, the term "K" means the ionization constant of the first available hydrogen ion at 25° C., the term "S" means the solubility at 25° C. expressed in gram equivalents per liter, the term "KS" means the product of K multiplied by S, and the term "excess" means excess over the amount equivalent to the ammonia.

Having thus described our invention, what we claim as new and desire to secure by Letters Patent of the United States is:—

1. The method of treating latex containing ammonia which consists in adding to the latex a compound of boron trioxide and a polyhydroxyl compound of the kind described in which two OH groups are bound to adjacent carbon atoms.

2. The method of treating latex containing ammonia which consists in adding to the latex a compound of boron trioxide and a sugar.

3. The method of treating latex containing ammonia which consists in adding to the latex boric acid and a sugar.

4. The method of treating a given weight of latex containing ammonia which consists in adding to the latex not less than one per cent by weight of a weak acid of low volatility, the permissible strength of the acid used varying inversely with its solubility in water and being expressed by K is less than $10^{-4.75}$ for a freely soluble acid and by KS is less than $10^{-5.5}$ for a sparingly soluble acid.

5. The method of treating a given weight of latex containing ammonia which consists in adding to the latex an excess over the equivalent amount of a weak acid of low volatility, the amount of acid added being not less than one per cent of the weight of the latex, the permissible strength of the acid used varying inversely with its solubility in water and being expressed by K is less than $10^{-4.75}$ for a freely soluble acid and by KS is less than $10^{-5.5}$ for a sparingly soluble acid.

6. The method of treating a given weight of latex containing ammonia which consists in adding to the latex not less than one per cent of a weak acid in solid form, the permissible strength of the acid used varying inversely with the solubility in water and being expressed by K is less than $10^{-4.75}$ for a freely soluble acid and by KS is less than $10^{-5.5}$ for a sparingly soluble acid.

7. The method of treating a given weight of latex containing ammonia which consists in adding to the latex not less than one per cent by weight of an acid compound of boron trioxide.

8. A cement comprising latex containing a reaction product of ammonia and a weak acid obtained by adding to the latex at least one per cent by weight of the acid.

In testimony whereof we have signed our names to this specification.

HERBERT W. KELLEY.
WILLIAM D. WOLFE.

ed either for the preservative effect desired or to increase the viscosity of the treated latex.

In the claims appended, the term "K" means the ionization constant of the first available hydrogen ion at 25° C., the term "S" means the solubility at 25° C. expressed in gram equivalents per liter, the term "KS" means the product of K multiplied by S, and the term "excess" means excess over the amount equivalent to the ammonia.

Having thus described our invention, what we claim as new and desire to secure by Letters Patent of the United States is:—

1. The method of treating latex containing ammonia which consists in adding to the latex a compound of boron trioxide and a polyhydroxyl compound of the kind described in which two OH groups are bound to adjacent carbon atoms.

2. The method of treating latex containing ammonia which consists in adding to the latex a compound of boron trioxide and a sugar.

3. The method of treating latex containing ammonia which consists in adding to the latex boric acid and a sugar.

4. The method of treating a given weight of latex containing ammonia which consists in adding to the latex not less than one per cent by weight of a weak acid of low volatility, the permissible strength of the acid used varying inversely with its solubility in water and being expressed by K is less than $10^{-4.75}$ for a freely soluble acid and by KS is less than $10^{-5.5}$ for a sparingly soluble acid.

5. The method of treating a given weight of latex containing ammonia which consists in adding to the latex an excess over the equivalent amount of a weak acid of low volatility, the amount of acid added being not less than one per cent of the weight of the latex, the permissible strength of the acid used varying inversely with its solubility in water and being expressed by K is less than $10^{-4.75}$ for a freely soluble acid and by KS is less than $10^{-5.5}$ for a sparingly soluble acid.

6. The method of treating a given weight of latex containing ammonia which consists in adding to the latex not less than one per cent of a weak acid in solid form, the permissible strength of the acid used varying inversely with the solubility in water and being expressed by K is less than $10^{-4.75}$ for a freely soluble acid and by KS is less than $10^{-5.5}$ for a sparingly soluble acid.

7. The method of treating a given weight of latex containing ammonia which consists in adding to the latex not less than one per cent by weight of an acid compound of boron trioxide.

8. A cement comprising latex containing a reaction product of ammonia and a weak acid obtained by adding to the latex at least one per cent by weight of the acid.

In testimony whereof we have signed our names to this specification.

HERBERT W. KELLEY.
WILLIAM D. WOLFE.

Certificate of Correction.

Patent No. 1,644,730.  Granted October 11, 1927, to

HERBERT W. KELLEY ET AL.

It is hereby certified that error appears in the printed specification of the above-numbered patent requiring correction as follows: Page 3, strike out lines 95 to 105, and insert the following:

| | Parts. | | Parts. |
|---|---|---|---|
| Borax | 3 | Dextrose | 6 |
| Boric Acid | 1 | Glycerine | 12 |
| Borax | 3 | Glycerine | 12 |
| Boric Acid | 1 | Invert Sugar | 3 |
| Borax | 3 | Invert Sugar | 6 | and that the said Letters Patent should be read with this correction therein that the same may conform to the record of the case in the Patent Office.

Signed and sealed this 22d day of November, A. D. 1927.

[SEAL.]

M. J. MOORE,
*Acting Commissioner of Patents.*

Certificate of Correction.

Patent No. 1,644,730.                                      Granted October 11, 1927, to

HERBERT W. KELLEY ET AL.

It is hereby certified that error appears in the printed specification of the above-numbered patent requiring correction as follows: Page 3, strike out lines 95 to 105, and insert the following:

| | Parts. | | Parts. |
|---|---|---|---|
| Borax | 3 | Dextrose | 6 |
| Boric Acid | 1 | Glycerine | 12 |
| Borax | 3 | Glycerine | 12 |
| Boric Acid | 1 | Invert Sugar | 3 |
| Borax | 3 | Invert Sugar | 6 | and that the said Letters Patent should be read with this correction therein that the same may conform to the record of the case in the Patent Office.

Signed and sealed this 22d day of November, A. D. 1927.

[SEAL.]                                                                   M. J. MOORE,
*Acting Commissioner of Patents.*